United States Patent [19]

Svarz

[11] 3,923,756

[45] Dec. 2, 1975

[54] THIN FILM CATALYTIC POLYMERIZATION OF WATER-IN-OIL EMULSIONS OF WATER-SOLUBLE ETHYLENICALLY UNSATURATED AMIDE MONOMERS

[75] Inventor: Jerry J. Svarz, La Grange, Ill.

[73] Assignee: Nalco Chemical Company, Oak Brook, Ill.

[22] Filed: Dec. 23, 1974

[21] Appl. No.: 535,988

[52] U.S. Cl. .................. 260/80.3 N; 260/89.7 R
[51] Int. Cl.² .................. C08F 2/32; C08F 120/56; C08F 220/06
[58] Field of Search .................. 260/80.3 N, 89.7 R

[56] References Cited
UNITED STATES PATENTS

| | | | |
|---|---|---|---|
| 3,573,263 | 3/1971 | Gill | 260/80.3 N |
| 3,732,193 | 5/1973 | Svarz | 260/80.3 N |
| 3,767,629 | 10/1973 | Vallino, Jr. et al. | 260/80.3 N |
| 3,876,573 | 4/1975 | Engelhardt et al. | 260/80.3 N |

FOREIGN PATENTS OR APPLICATIONS

| | | |
|---|---|---|
| 869,333 | 5/1961 | United Kingdom |
| 1,092,844 | 11/1967 | United Kingdom |

*Primary Examiner*—Alan Holler
*Attorney, Agent, or Firm*—Lockwood, Dewey, Zickert & Alex

[57] ABSTRACT

Water-in-oil emulsions of water-soluble ethylenically unsaturated amide monomers, alone or in the presence of acrylic acid or alkyl-substituted acrylic acid are continuously catalytically polymerized, or co-polymerized, in thin films or layers and in the absence of oxygen at temperatures maintained within plus or minus 3°C. of predetermined optimum polymerization or co-polymerization temperatures.

9 Claims, 3 Drawing Figures

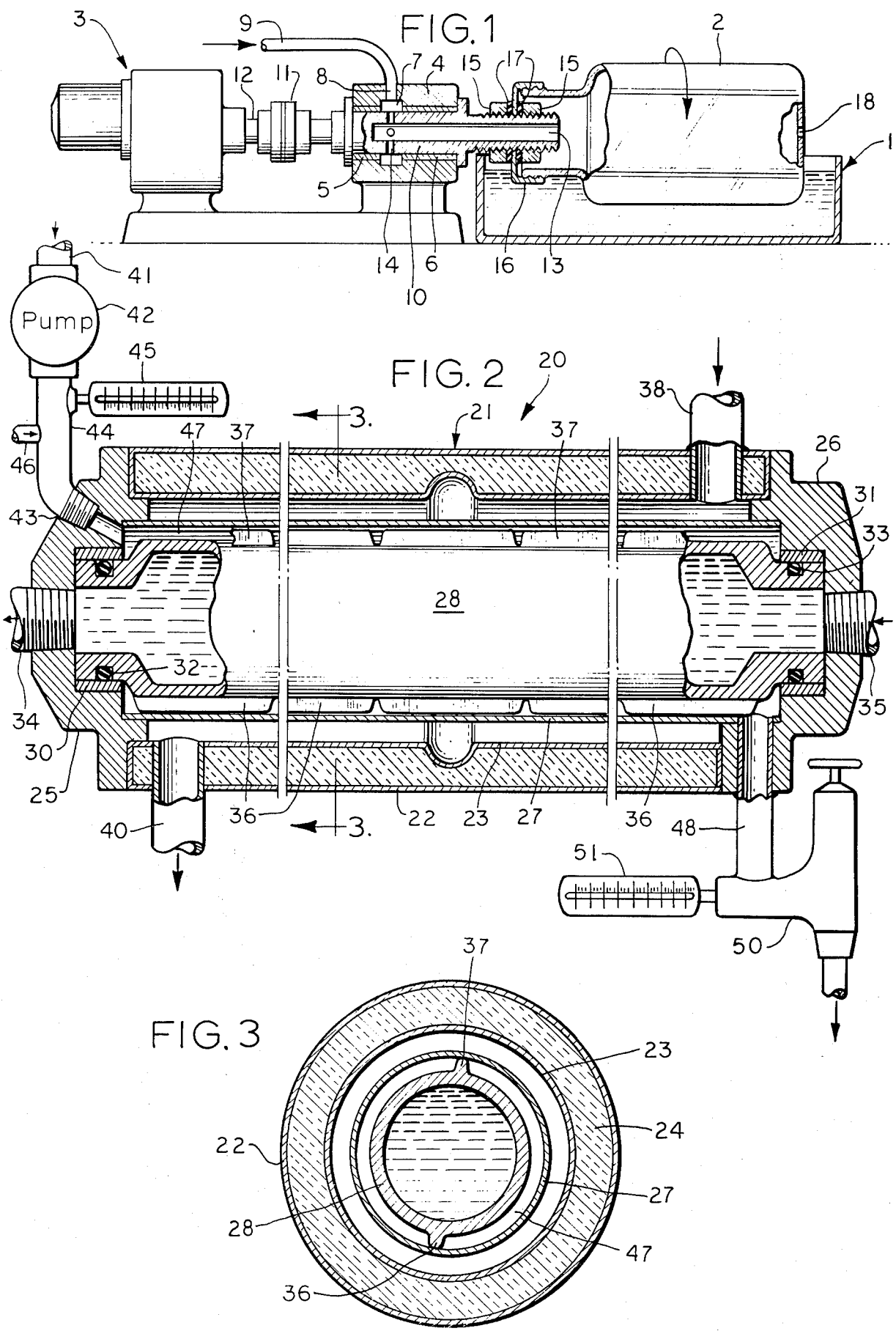

THIN FILM CATALYTIC POLYMERIZATION OF WATER-IN-OIL EMULSIONS OF WATER-SOLUBLE ETHYLENICALLY UNSATURATED AMIDE MONOMERS

This invention relates to improvements in the continuous catalytic emulsion polymerization or co-polymerization of water-soluble ethylenically unsaturated amide monomers alone or in combination with acrylic acid or alkyl-substituted acrylic acid.

More specifically, the invention relates to such a polymerization or co-polymerization process wherein a mixture of a water-in-oil emulsion of water-soluble ethylenically unsaturated amide monomer and a catalyst therefor are continuously flowed or passed in the form of a thin layer or film through the correspondingly thin or narrow reaction chamber of a heat exchanger designed and operated in such manner that the temperature of the mixture is maintained within plus or minus 3°C. of a predetermined optimum polymerization or co-polymerization temperature. The polymerization or co-polymerization is carried out in the substantial absence of oxygen and preferably in the presence of an inert gas such as nitrogen since oxygen tends to inhibit polymerization.

It has been previously known to polymerize and co-polymerize monomers of water-soluble ethylenically unsaturated amides in the absence of oxygen. Thus, U.S. Pat. No. 3,284,393 dated November 8, 1966 discloses a batch process wherein water-in-oil emulsions of the monomers are polymerized while applicant's U.S. Pat. No. 3,732,193 dated May 1973 discloses a continuous process wherein aqueous solutions of the monomers are polymerized. The present invention constitutes an improvement over such prior processes in that the temperature of a continuously flowing thin film or layer of the substantially oxygen-free mixture of catalyst and water-in-oil emulsion of the water-soluble ethylenically unsaturated amide is maintained substantially at a predetermined optimum temperature, i.e. within not more than plus or minus 3°C. therefrom and preferably within plus or minus 1°C.

In addition to the usual advantages of a continuous process over a batch process, i.e. uniformity of product and automatic control, the process of the present invention is characterized by its rapidity, flexibility and high degree of polymerization or co-polymerization obtainable.

The process of the present invention is particularly useful in polymerizing or co-polymerizing such monomers as acrylamide, methacrylamide, acrylamide-acrylic acid monomer and acrylamide-methacrylic monomer. The catalysts which are useful for the process are of the free radical initiator type and are preferably of the azo type compounds such as 2, 2' -azobis (isobutyronitrile) and azobis ($\alpha\alpha$- dimethylvalenonitrile) used in amounts between 0.001 to 5% by weight of the monomer in the emulsion. Various water-in-oil emulsifiers may be used such as sorbitan mono-oleate, sorbitan monostearate, hexadecyl sodium phthalate, cetyl or stearyl sodium phthalate, metal soaps, and the like. Emulsifying agents having a low hydrophilelyophile balance are preferable.

The object of the invention generally stated is the provision of an improved process whereby water-soluble ethylenically unsaturated amide monomers may be continuously polymerized or co-polymerized by forming a water-in-oil emulsion thereof and mixing it with a suitable catalyst and then heating the mixture to within plus or minus 3°C. of predetermined temperature while in the form of a thin film or layer flowing through the correspondingly narrow reaction chamber of a heat exchanger.

A further object of the invention is a continuous process of the foregoing type whereby polymers and copolymers of water-soluble ethylenically unsaturated amide monomers, alone or in the presence of an acrylic acid, may be produced which have excellent uniformity and high degrees of polymerization or co-polymerization.

Certain other objects of the invention will be obvious to those skilled in the art in the light of the following detailed description of the invention.

For a more complete understanding of the nature and scope of the invention reference may now be had to the following detailed description thereof taken in connection with the accompanying drawings wherein:

FIG. 1 is a diagram of an apparatus that may be used for carrying out the polymerization or co-polymerization reaction of the present invention on a laboratory scale;

FIG. 2 is a longitudinal section view, partly in elevation, of an apparatus that may be used for carrying out the polymerization or co-polymerization reactions of the present invention on a pilot plant or production scale; and FIG. 3 is a sectional view taken on line 3—3 of FIG. 2.

In FIG. 1 a laboratory set-up is shown comprising a water bath 1 arranged to be automatically maintained at any predetermined temperature, a cylindrical container 2 such as a 1 gallon container, an electric motor-speed reducer 3 for rotating the bottle 2 about its longitudinal axis, and suitable means for interconnecting the bottom 2 with the motor-speed reducer 3. The latter means comprises a support 4 for a pair of sleeve bearings 5 and 6 separated by a circumferential groove 7 in the support that serves to distribute nitrogen or other inert gas introduced through a port 8 into which an inlet conduit 9 is connected. A rotor 10 is journaled within the bearings 5 and 6 being connected by a coupling 11 at one end to the output shaft 12 from the speed reducer 3. The rotor 10 has a bore 13 extending inwardly from its right hand end to past the groove 7. Four radial holes 14 communicate between the bore 13 and the groove. The projecting right hand end of the rotor 10 is externally threaded and has two nuts 15—15 screwed thereon on opposite sides of a cap 16 which is screwed onto the mouth of the bottle 2. A pair of washer gaskets 17—17 on the inner opposing faces of the nuts 15 serve to make a gas-tight connection with the bottle 2. It will be seen that the bottle 2 is supported in cantilever fashion from the rotor 10 so as to rotate therewith when the motor-speed reducer 3 is operating.

Nitrogen or other gas introduced through conduit 9 flows through the groove 7 and holes 14 into the bore 13 and into the bottle 2 which is provided with a small opening 18 through which the gas may escape.

In using the apparatus shown in FIG. 1 a water-in-oil emulsion of water-soluble ethylenically unsaturated amide monomers together with a catalyst are introduced into the bottle 2 which is temporarily removed from the set-up shown in FIG. 1 for this purpose. The quantity of the mixture of catalyst and water-in-oil emulsion introduced into the bottle 2 is such that on rotation of the bottle the mixture forms a thin layer or film coating the interior side wall surface of the bottle. It may be desirable to rotate the pre-warmed bottle 2 in air for a short period of time before it is placed in the water bath 1. Preferably, an inert gas such as nitrogen is introduced into the bottle through the connection 9 so as to displace air from within the bottle 2 and permit the polymerization reaction to take place in the absence of oxygen.

In FIGS. 2 and 3 a heat exchanger reactor is indicated generally at 20 in which the catalytic polymerization or co-polmerization processes of the present invention may be advantageously carried out in a continuous manner. Briefly, the apparatus comprises a cylindrical body 21 having an outer sheath or shell 22 and an inner shell 23 with suitable insulating material 24 disposed in between. The left hand end of the apparatus is closed by an end wall 25 while the right hand end is closed by an end wall 26. A smaller cylindrical shell 27 is co-axially supported in spaced relationship within the insulated outer body 21 at opposite ends by the end walls 25 and 26. In addition there is supported between the end walls 25 and 26 a hollow rotor 28, being journaled at the left end in the end wall 25 by a suitable bearing 30 and that the right end in the end wall 26 by a bearing 31. O-ring seals 32 and 33 are provided within the bearings 30 and 31 to provide fluidtight seals. Nipples 34 and 35 are screwed into center openings in the end walls 25 and 26, respectively, whereby a heat transfer medium such as water may be introduced into the rotor 28 so as to maintain the cylindrical side wall thereof at a predetermined temperature while effecting a substantial rate of heat transfer therethrough.

Preferably the rotor 28 is provided at diametric positions with a series of aligned scrapers or fims 36—36 and 37—37 for wiping material from the inner surface of the inner stationary shell 27.

Water or other heat transfer medium is circulated in the space between the inner stationary shell 27 and the inner wall 23 of the outer shell being introduced through the inlet connectin 38 and removed through the outlet 40.

In operation, a mixture of catalyst and a water-in-oil emulsion of water-soluble ethylenically unsaturated amide monomer is introduced into the apparatus through the inlet pipe 41 discharging into the inlet connection of a pump 42 of known type, such as a positive displacement pump, the discharge of which connects with the inlet port 43 in the end wall 25 of the heat exchanger apparatus 20. The connection 44 between the pump 42 and port 43 is preferably provided with an indicating thermometer 45 and also with a side inlet connection 46 through which an inert gas such as nitrogen may be introduced under pressure. The nitrogen serves to displace any air or oxygen that may be present in the catalyst/emulsion mixture so that as the mixture flows through the heat exchanger apparatus the reaction chamber 47 thereof is substantially free of oxygen. It will be noted that the reaction chamber 47 has a relatively thin or narrow cross section and is formed or defined by and between the outer surface of the rotor 28 and the inner surface of the inner stationary shell 27. The space may vary in width from 1/32 to 3 inches. Thus, relatively large and efficient heat transfer surface areas are provided for the reaction chamber which surfaces can be maintained at or very close to a predetermined temperature so that the reaction mass flowing therethrough may in turn be maintained within plus or minus 3°C., and preferably plus or minus 1°C., of a predetermined optimum polymerization or copolymerization temperature.

It will be seen that the heat exchanger apparatus 20 is provided at the right hand ends with a discharge connection 48 having a fitting 50 incorporating a throttle valve of known type so that the rate of flow of the liquid latex polymer or co-polymer discharging from the apparatus may be suitably regulated. Desirably a second thermometer is provided in the fitting 50.

General Procedure

The general procedure for carrying out the continuous catalytic emulsion polymerization or co-polymerization of water-soluble ethylenically unsaturated amide monomers in accordance with the present invention comprises the following steps:

a. forming a tight water-in-oil emulsion of the water-soluble ethylenically unsaturated amide monomer, with or without acrylic acid or alkyl substituted acrylic acid;

b. mixing a free radical initiator catalyst with the water-in-oil emulsion at a temperature substantially below that at which polymerization or co-polymerization occurs to any appreciable extent;

c. introducing the water-in-oil emulsion/catalyst mixture together with nitrogen or other inert gas into the inlet to a reaction chamber of a heat exchanger, the reaction chamber having a uniform narrow cross section formed between two opposing surfaces at least one of which includes a substantial heat transfer area;

d. operating the heat exchanger so as to maintain the heat transfer surface or surfaces thereof within plus or minus 3°C. of a predetermined optimum polymerization or co-polymerization termperature; and e. continuously discharging the polymer or co-polymer latex and either using it as such or recovering the polymer or co-polymer product therefrom such as by precipitation with alcohol followed by washing and vacuum drying.

The following examples will serve to further disclose and illustrate the invention and make known the presently preferred embodiment thereof.

EXAMPLE I

A water-in-oil emulsion is prepared by first making an aqueous monomer solution of the following composition which has a final pH of 8.5:

|  | Parts by Weight |
|---|---|
| Acrylamide | 57.2 |
| Acrylic acid | 24.0 |
| NaOH (50% caustic) | 26.9 |
| Water (softened or de-ionized) | 108.0 |
| Versene (ethylene diamine tetra-acetic acid) | 0.015 |

A solvent or oil fraction is prepared having the following composition:

|  | Parts by Weight |
|---|---|
| Isopar M (hydrocarbon solvent | 72.2 |
| Span 80 (sorbitan mono-oleate) | 4.1 |

Isopar M is a narrow-cut branch-chain isoparaffinic solvent sold by Humble Oil & Refining Company and having the following typical specifications:

| Specification Properties | Minimum | Maximum | Test Method |
| --- | --- | --- | --- |
| Gravity, API at 60/60°F. | 48.0 | 51.0 | ASTM D 287 |
| Color, Saybolt | 80 | | ASTM D 156 |
| Aniline point, °F. | 185 | | ASTM D 611 |
| Sulfur, p.p.m. | | 10 | ASTM D 1266* |
| Distillation, °F. | | | ASTM D 86 |
| IBP | 400 | 410 | |
| Dry point | | 495 | |
| Flash point, °F. (Pensky-Martens closed cup). | 160 | | ASTM D 93 |

*Nephelometric mod.

145 parts of the solvent fraction are introduced into an efficient mixer or blender; e.g. an Osterizer for small quantities. With the mixer or blender in operation at mixing speed, 350 parts of the monomer solution are slowly added in one minute and mixing is continued for one minute at slow speed after complete addition. In a separate container containing 50 grams of the water-in-oil emulsion or latex formed in the mixer, there is added 0.85cc of Vazo 64 catalyst — 2, 2′ azobis (isobutyronitrile) — in toulene, i. e. 0.2% by weight addition of catalyst based on the weight of the monomer content of the emulsion. The contents of the container are stirred well and then introduced into a 1 gallon bottle pre-heated to 158°F. The bottle with contents is rotated in a water bath maintained at 158°F. in accordance with the set-up shown in FIG. 1. After two minutes of rotation the bottle is purged with nitrogen while rotation is continued for eight minutes at a speed of 60 rpm. Twenty four grams of the latex polymer are removed from the bottle and added with stirring to 400 ml. of methyl alcohol. The precipitated polymer is separated, washed with 100 ml. of methyl alcohol and vacuum dried overnight at 40°C. A 0.5% aqueous solution of the dried co-polymer gave a Brookfield viscosity of 7200 (36 × 200) using a No. 3 spindle at 6 rpm. On examination the polymer had an intrinsic viscosity of 26.4, a Huggins constant of 0.32 and a molecular weight of about 22,000,000.

EXAMPLE II

Repeat Example I but the 1 gallon bottle is rotated in air at room temperature for five minutes while purging the interior with nitrogen. The bottle is then rotated in the water bath at 150°F. for nine minutes while continuing to purge with nitrogen. Twenty four grams of the liquid latex polymer from the bottle are precipitated, washed and dried as in Example I. The polymer has a Brookfield viscosity of 7800, and intrinsic viscosity of 31.2, a Huggins constant of 0.29, and molecular weight of 20,000,000. Analysis of the liquid latex polymer gave a 5.1% content or acrylamide based on the solids.

EXAMPLE III

Repeat Example 1 but rotate the bottle and contents in air with $N_2$ purge for eight minutes and then rotate for twelve minutes in 146°–148°F. water bath with $N_2$ purge. Twenty four grams of latex polymer are precipitated, washed and dried as before. The polymer as a Brookfield viscosity of 26.0, a Huggins constant of 0.41E and molecular weight of 7,000,000.

EXAMPLE IV

A water-in-oil emulsion is prepared by first making an aqueous monomer solution having the following composition with a final pH of 8.5:

| Acrylamide | 209.5 | grams |
| --- | --- | --- |
| Methacrylic acid | 15.6 | ″ |
| NaOH (50%) | 14.7 | ″ |
| Water-soft | 235.3 | ″ |
| Versene | 1.95 | cc |

The oil or solvent phase is prepared with the following composition:

| Isopar M | 186.0 | grams |
| --- | --- | --- |
| Span 80 | 10.8 | ″ |

70.8 grams of the monomer solution and 29.2 grams of the oil or solvent are formed into an emulsion as in Example I and 3.5 ml. of Vazo 64 in toluene having a catalyst content equal to 2% of the monomer are stirred in. Fifty grams of the monomer emulsion are put into a 1 gallon bottle pre-warmed to 158°F. and rotated in air for five minutes while being purged with $N_2$. Twenty five grams of the latex polymer are precipitated in 400 ml. of a 1-to-1 mixture of methyl alcohol and acetone. The precipitated polymer is washed with 100 ml. of the mixture and then vacuum oven dried overnight at 40°C. The polymer has a Brookfield viscosity with No. 3 spindle and 12 rpm of 1400 (14 × 600); an intrinsic viscosity of 16.3, a Huggins constant of 0.69E and a molecular weight of about 22,000,000.

EXAMPLE V

Example II was repeated except that the water bath was maintained at 160°F. instead of at 150°F. and the polymer product was precipitated, washed and dried as in Example IV. The polymer has a Brookfield viscosity of 900 using a No. 3 spindle at 12 rpm (9 × 100). The intrinsic viscosity, Huggins constant and molecular weight were not obtained.

EXAMPLE VI

A water-in-oil emulsion is prepared by first making an aqueous monomer solution of the following composition:

| | Grams |
| --- | --- |
| Acrylamide | 142.1 |
| Sipomer Q5 (dimethyl sulphate quaternary of dimethylamino ethyl methacrylate) | 18.7 |
| Water-soft | 203.0 |
| Citric Acid (2.5g/100cc) | 0.025 |

An oil or solvent fraction is prepared having the following composition:

| Isopar M | 123.3 | grams |
| --- | --- | --- |
| Span 80 | 3.4 | ″ |
| Alkaterge emulsifier (substituted) oxazolines) | 3.4 | ″ |

The emulsion is made up from the monomer solution and solvent as in Example I using 216 grams of the monomer solution and 76.3 grams of the oil or solvent fraction. To 50 grams of the emulsion were added 1.5cc of Vazo 52 catalyst — 2, 2′ -azobis (dimethylcaleronitrile) — in Isopar M with the catalyst content added being equal to 0.2% by weight of the monomer. The emulsion/catalyst mixture was poured into a 1 gallon bottle pre-warmed to 158°F. and rotated in air for five minutes with nitrogen purge. The bottle was then rotated in a water bath at 150°F. for ten minutes with the $N_2$ purge continued. Twenty five grams of the latex polymer were precipitated and washed with a 1-to-1 methylalcohol- acetone mixture and dried as in Example IV. The polymer has an intrinsic viscosity of 15.9, a Huggins constant of 47 and a molecular weight of about 11,000,000. Some pimple-like deposits were observed on the inner surface of the bottle indicating that the polymerization had not proceeded uniformly.

EXAMPLE VII

To the remaining fifty grams of the emulsion prepared in Example VI 1.5cc of Vazo 52 in Isopar M were added and the mixture was placed in a 1 gallon bottle and polymerized in the same way as in Exmple VI except that the water bath was at a temperature of 160°F. The polymerization went smoothly and there were no pimple-like deposits on the surface of the bottle. The polymer had an intrinsic viscosity of 14.1, a Huggins constant of 0.46E and a molecular weight of about 9,000,000.

The polymers or co-polymers produced in accordance with the invention have various known industrial uses either in the liquid latex form or after separation, washing and drying. For example, the liquid latex polymers may be used for several different purposes including: in water clarification, in de-watering sludges, in paper manufacture, in sugar refining and in ore and coal recovery.

I claim:

1. In the continuous catalytic emulsion polymerization or co-polymerization of water-soluble ethylenically unsaturated amide monomers alone or in the presence of acrylic acid or alkyl-substituted acrylic acid while flowing in a thin layer, the steps which comprise: feeding a mixture of water-in-oil emulsion of water-soluble ethylenically unsaturated amide monomer and polymerization catalyst therefor into a heat exchanger having a reaction chamber of uniformly narrow cross section formed between opposing surfaces at least one of which provides a heat transfer surface of substantial area; flowing said mixture through said reaction chamber while said heat transfer surface area thereof is maintained within plus or minus 3°C. of a predetermined polymerization or co-polymerization temperature; and, maintaining said reaction chamber and said mixture flowing therethrough, substantially free of oxygen.

2. The method called for in claim 1 wherein both of said opposing surfaces provide heat transfer surfaces of substantial area and both are maintained within plus or minus 3°C. of said predetermined temperature.

3. The method as called for in claim 1 wherein said reaction chamber and contents are maintained substantially free of oxygen by continuously introducing an inert gas into said mixture prior to feeding the same into the reaction chamber of said heat exchanger.

4. The method of claim 3 wherein the inert gas is nitrogen.

5. The method called for in claim 1 wherein the rate of flow of said mixture through said reaction chamber is maintained so as to allow substantially all of the monomer content to polymerize or co-polymerize.

6. The method of claim 1 wherein said monomer is selected from the group consisting of acrylamide, methacrylamide, acrylamide-acrylic acid, and acrylamide-methacrylic acid.

7. The method of claim 1 wherein said predetermined temperature is in the range of from about 25°C. to about 85°C.

8. The method of claim 1 wherein said catalyst is selected from the group consisting of 2, 2' - azobis (isobutyronitrile) and azobis ($\alpha,\alpha$ - dimethylvalenonitrile).

9. The method of claim 1 wherein said thin layer ranges from 0.1 mm. to 75 mm. in thickness.

* * * * *